Figure 1:
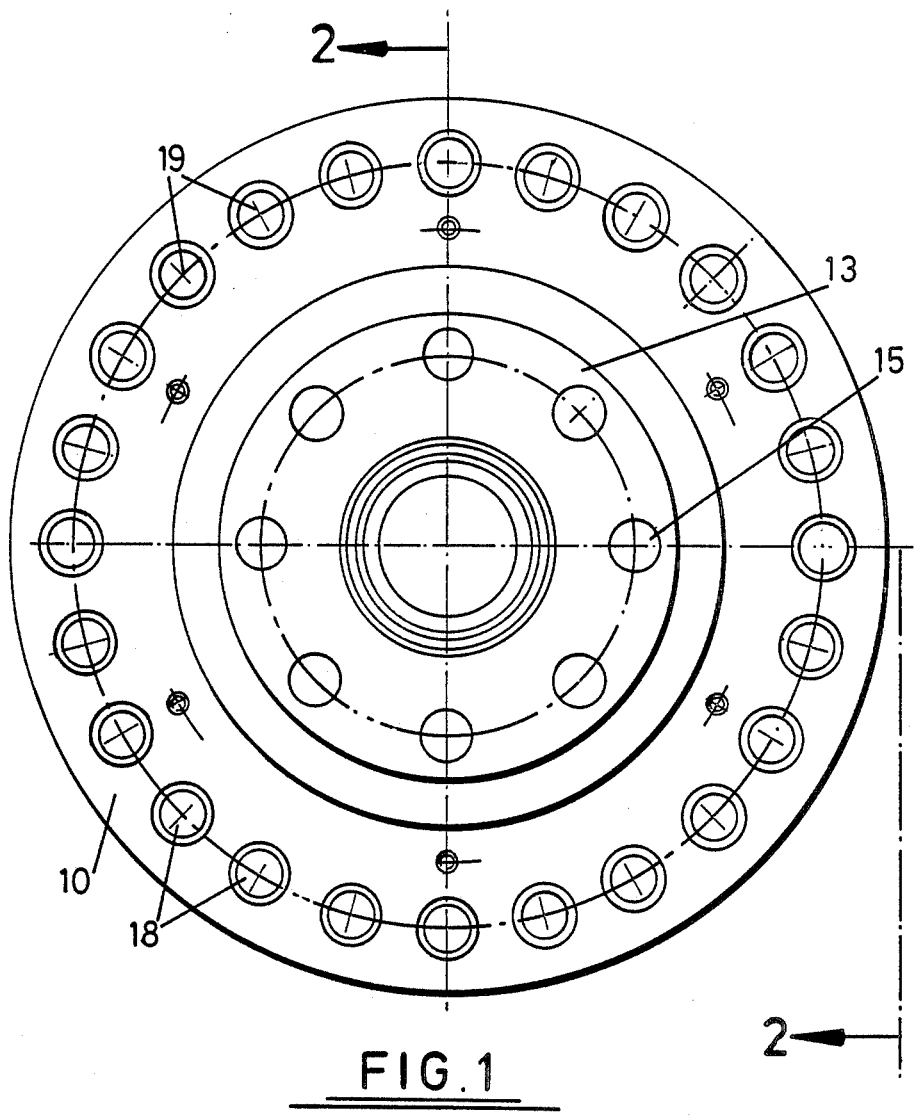

United States Patent [19]

McCann

[11] Patent Number: 4,801,161
[45] Date of Patent: Jan. 31, 1989

[54] ROTARY PIPE COUPLING

[75] Inventor: James McCann, Midcalder, Scotland

[73] Assignee: Vickers PLC, London, England

[21] Appl. No.: 41,724

[22] Filed: Apr. 23, 1987

[30] Foreign Application Priority Data

May 8, 1986 [GB] United Kingdom ............... 8611274

[51] Int. Cl.$^4$ ............................................. F16L 35/00
[52] U.S. Cl. ........................................ 285/93; 285/98;
285/276; 285/281; 285/379
[58] Field of Search ................. 285/93, 281, 98, 276,
285/379

[56] References Cited

U.S. PATENT DOCUMENTS

| | | | |
|---|---|---|---|
| 3,649,056 | 3/1972 | Frohlich et al. | 285/276 |
| 3,715,134 | 2/1973 | Fallow | 285/276 |
| 3,850,454 | 11/1974 | Paddington | 285/98 |
| 4,234,216 | 11/1980 | Swanson | 285/276 X |
| 4,355,827 | 10/1982 | Ehret | 285/98 |

*Primary Examiner*—Dave W. Arola
*Attorney, Agent, or Firm*—Stephen G. Rudisill

[57] ABSTRACT

A rotary pipe coupling with replaceable seals is described. The pipe coupling has a first seal element connected to a first body portion and a second seal element connected to a second body portion. The seal elements are defined stepped seal cavities into which are disposed seals. The first and second body portions are removably coupled to respective outer and inner ball races of a ball race to permit relative rotation of the first and second body portions. The effectiveness of the inner seal can be ascertained by detecting the pressure of fluid at port via a stop valve and passage extending to the interface between the seals. The seals can be replaced, if required, by separating first and second body portions by removing one set of fasteners securing one of the body portions to the bearing unit to expose seal cavities.

7 Claims, 2 Drawing Sheets

ROTARY PIPE COUPLING

This invention relates to a rotary pipe coupling and has particular, but not exclusive, application to pipe couplings used in offshore installations which incorporate pipe systems through which raw crude oil is fed.

Rotary pipe couplings of the swivel type and to which the present invention relates, have previously been proposed for coupling together two pipe sections in a manner which will allow one pipe section to rotate relative to an adjacent pipe section about a common longitudinal axis whilst at the same time maintaining an effective fluid seal between the two sections. In such previously proposed arrangements there has been a serious disadvantage in that when the seal proper incorporated in the coupling wears or is damaged and/or the structural elements which mate with the seal become worn or damaged, the seal and/or the mating structural elements are not readily accessible for replacement and it has therefore been necessary to remove the rotary pipe coupling in total and replace it by a completely new coupling.

Another detrimental aspect of previous inventions is that when fluid is leaked past the seal proper it would enter the bearing causing extreme damage and as such the complete rotary pipe coupling in total would need to be replaced. It will be readily apparent that such an arrangement is expensive.

An object of the present invention is to provide a rotary pipe coupling for connecting two pipe sections together in a manner which allows the sections to be relatively rotatable but in which the coupling can be easily and readily dismantled to allow access to internal members, seals, sleeve, seal ring, bearing protection seals etc., so that they can be easily replaced without the necessity of replacing the entire coupling.

According to the present invention there is provided a rotary pipe coupling for connecting together two pipe sections in a relatively rotatable manner, said coupling comprising a first body portion adapted to be connected to a first pipe section, a second body portion adapted to be connected to a second pipe section, and rotary bearing means interconnecting the first and second body portions to permit relative rotation therebetween, characterised in that there is provided first seal element means connected to the first body portion and second seal element means connected to the second body portion, said first and second seal element means defining therebetween at least one seal cavity for receiving a replaceable sealing member therein to prevent leakage of fluid passing through the coupling to the exterior of the coupling, and fastening means for enabling separation of said first and second seal elements to permit ready replacement of the sealing member.

Preferably, the first and second seal element means define two seal cavities.

Figure 2:
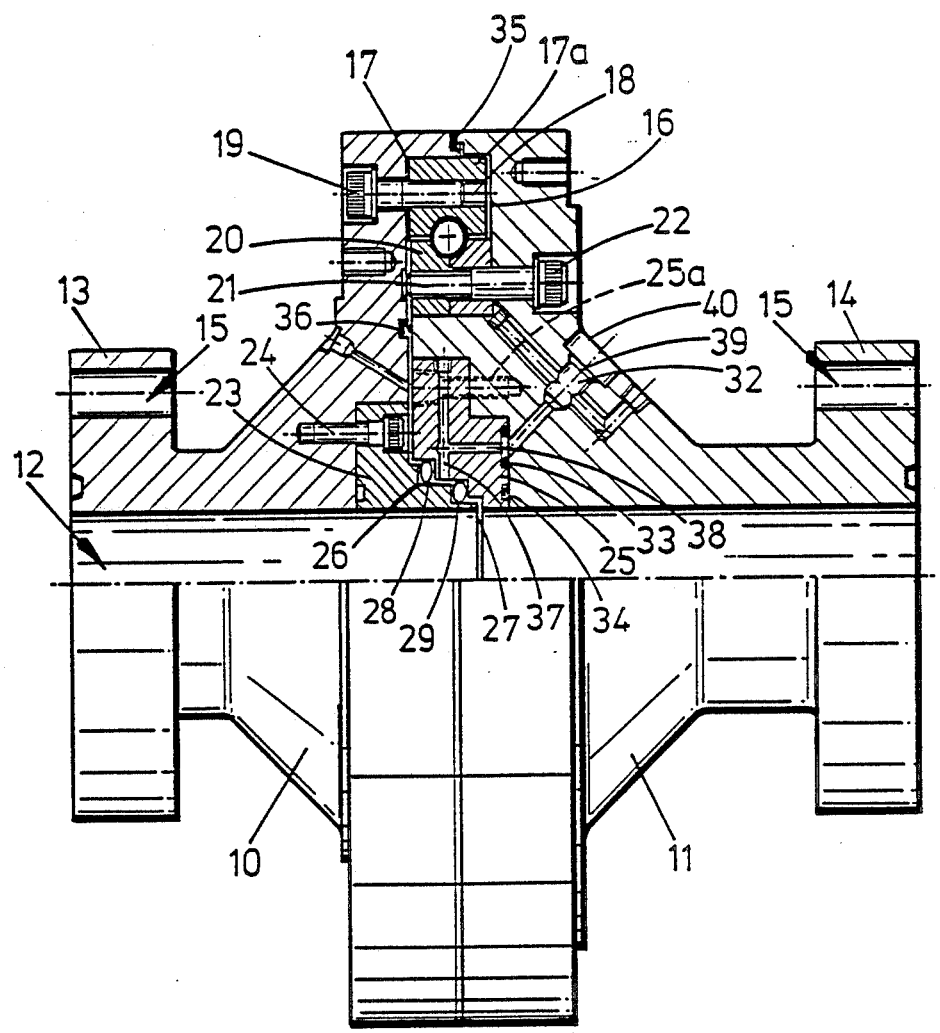

An embodiment of the present invention will now be described, by way of example, with reference to the accompanying drawings, in which:

FIG. 1 is an end view of a pipe coupling in accordance with the present invention; and FIG. 2 is a part sectional side view of the coupling of FIG. 1 on the line 2—2 thereof.

Referring to the drawings, a rotary pipe coupling for interconnecting two adjacent pipe sections comprises first and second body portions 10 and 11 defining a central bore 12 through which oil or other fluid can be delivered. Each body portion 10 and 11 is provided with means whereby it can be connected to other pipeline elements (e.g. threaded connections, welded connections, clamp connections, stub bolt connections) such as integral and flanges 13 and 14 respectively having annularly disposed holes 15 therein for enabling each flange to be bolted to a respective pipe line element.

Towards its central portion, each body portion 10, 11 is provided with an internal recess which co-operate to define a cavity 16 when the body portions 10 and 11 are mated together. Within the cavity 16 there is located a ball bearing unit 17, an outer vall race 17a of which is provided with a plurality of annularly spaced bores 18 for receiving fasteners 19 passing through the first body portion 10. In this way the outer race is rigidly connected to the first body portion 10. Similarly, inner race 10 of the bearing unit 17 is provided with annularly spaced bores 21 for receiving fasteners 22 passing through the second body portion 11 so that the inner race 20 is rigidly connected to the second body portion 11. Consequently, the first and second body portions 10 and 11 can rotate relative to one another through the intermediary of the ball bearing unit 17.

Radially inwardly of the bearing unit 17 the abutting faces of the first and second body portions 10 and 11 are provided with machined recesses. The recess in the first body portion 10 receives a seal sleeve 23, the sleeve 23 being bolted to the body portion 10 by means of fasteners 24. The recess in the second body portion 11 receives a sealing ring 25 which is bolted to the second body portion by means of fasteners 25a. The seal sleeve 23 and the sealing ring 25 are correspondingly stepped to define between them a number of seal cavities, within each of which is received an annular seal. The number of cavities is always greater than one. FIG. 2 shows a pair of seal cavities, within each of which is received an annular seal 28,29 respectively. The seals 28,29 are intended to prevent any leakage of crude oil or dirt penetrating from the central bore of the pipe coupling to the bearing unit 17. Each seal 28,29 has a glass-loaded outer shell of low friction material such as polytetrafluoroethylene and which shell contains an elastomeric energiser core which is elastomeric and/or metallic with a back-up anti-extrusion ring. It should be noted that, depending on the operating pressure and fluid medium, other types of seal can be employed.

Two O-ring seals 33 and 34 are provided between the junction of the sealing ring 25 and the second body portion 11 and a pair of lip seals 35,36 are provided in annular grooves formed in the first body member 10. The radially outer lip seal 35 is located adjacent the radially peripheral junction between the first and second body portions 10,11 and externally of the bearing unit 17. The second lip seal 36 is located between the first and second body portions 10 and 11 radially inwardly of the bearing unit 17.

The sealing ring 25 is provided with a bleed port 37 which opens into the interface between the seals 28, 29 and extends via passages 38,39 to the exterior of the pipe coupling. Passage 39 leads to an external cavity 32 in body portion 11 which houses a stop valve (not shown) which interrupts the connection of passage 39 with port 40. An indication of fluid leakage past seal 29, as fluid will flow through passages 38, 39 to stop valve. When stop valve is opened the fluid moves from passage 39 to port 40 via stop valve thus providing evidence that seal 29 is defective. Thus indication is given that seal replacement is required.

Surface areas adjacent the two main seals 28,29 and the two main O-rings 33,34 on both the seal ring 25 and seal sleeve 23 are preferably inlaid with a facing of an anti-corrosion and/or anti-erosion material thus ensuring enhanced life characterisation.

Corresponding areas on the first and second body portions 10,11 adjacent the two main O-rings are preferably inlaid with a anti-corrosion facing material, such as stainless steel.

Should the seals 28,29, the sleeve 23 or seal ring 25 require to be replaced, it will be appreciated that it is a relatively simple matter for the two co-operating body portions 10 and 11 to be separated from each other by removing one set of fasteners 19 or 22 securing one of the body portions to the bearing unit 17. The two body portions can then be separated from each other to expose the seal cavities 26,27.

Various modifications may be made to the embodiment hereinbefore described without departing from the scope of the invention, for example, fluid passing through bore 12 can be a mixture of gas, liquid or slurry or a combination of these. Also the anti-corrosion facing material on the first and second body portions may be other than stainless steel. In addition, there may be any number of sealing elements 28,29 as required and the seal mating structural elements can also be replaced. Also, if there are more than two seal elements, then the number of detection mechanism, i.e. passages and ports, can be increased. Also bearing. It will be appreciated that when the number of seal cavities and seal are increased then the number of leakage monitor points are also increased. Also the ball bearing 17 may be replaced by any other suitable bearing unit, for example, roller bearing or hydrostatic bearing.

I claim:

1. A rotary pipe coupling for connecting together two pipe sections in a relatively rotatable manner, said coupling comprising a first body portion adapted to be connected to a first pipe section, a second body portion adapted to be connected to a second pipe section, and rotary bearing means interconnecting the first and second body portions to permit relative rotation therebetween, characterized in that there is provided first seal element means connected to the first body portion and second seal element means connected to the second body portion, said first and second seal element means defining therebetween at least two seal cavities for receiving at least two replaceable dynamic sealing members therein, one sealing member being provided for each cavity to prevent leakage of fluid passing through the coupling to the exterior of the coupling, said cavities being stepped so that said sealing members are disposed at different and spaced radial and axial positions along the same potential fluid leakage path and fastening means enabling separation of said first and second seal elements to permit ready replacement of the sealing members.

2. A rotary pipe coupling as claimed in claim 1 wherein at least one sealing element and the body portion coupled thereto define passage means for detecting said fluid leaking from said seal cavity therein extending to the exterior of the body portion.

3. A rotary pipe coupling as claimed in claim 2 wherein said first sealing element and said second sealing element and said second body portion define said passage means for detecting said fluid leaking from said cavity.

4. A rotary pipe coupling as claimed in claim 1 wherein said rotary bearing means is a two-part ball race, one race being removably fastened by fastening means to said first body portion.

5. A rotary pipe coupling as claimed in claim 4 wherein said outer race is fastened to the first portion and the inner race is fastened to the second portion.

6. A rotary pipe coupling as claimed in claim 1 wherein sealing means are provided between said seal elements and said housings.

7. A rotary pipe coupling as claimed in claim 1 wherein sealing elements are provided between said first body portion and said second body portion at radially and axially different positions.

* * * * *